United States Patent [19]
Royse

[11] Patent Number: 5,201,337
[45] Date of Patent: Apr. 13, 1993

[54] APPARATUS FOR MIXING FLUIDS OF DIFFERENT SPECIFIC GRAVITY

[75] Inventor: Edwin H. Royse, Dallas, Tex.

[73] Assignee: Royse Manufacturing Company, Inc., Dallas, Tex.

[21] Appl. No.: 698,473

[22] Filed: Apr. 30, 1991

[51] Int. Cl.⁵ ............................................. G05D 11/06
[52] U.S. Cl. ..................................... 137/91; 73/438
[58] Field of Search ......................... 137/91; 73/438

[56]  References Cited
U.S. PATENT DOCUMENTS

| | | | |
|---|---|---|---|
| 3,690,184 | 9/1972 | Chadenson | 73/438 |
| 3,848,618 | 11/1974 | Royse | 137/91 |
| 4,398,554 | 8/1983 | Kondo | 137/91 |

*Primary Examiner*—Robert G. Nilson
*Attorney, Agent, or Firm*—Richards, Medlock & Andrews

[57] ABSTRACT

A specific gravity control apparatus 200 is disclosed which uses a plurality of electrodes 202, 204 and 206 to measure the height of a control liquid within a leg 8 to provide enhanced control of the specific gravity of the solution S. In a specific gravity control apparatus 250, a flexible diaphragm 254 isolates the solution from a control fluid. This permits a nonconductive solution to be maintained at a specific gravity by the apparatus using at least one electrode to measure the level of the control liquid which can be conductive.

4 Claims, 6 Drawing Sheets

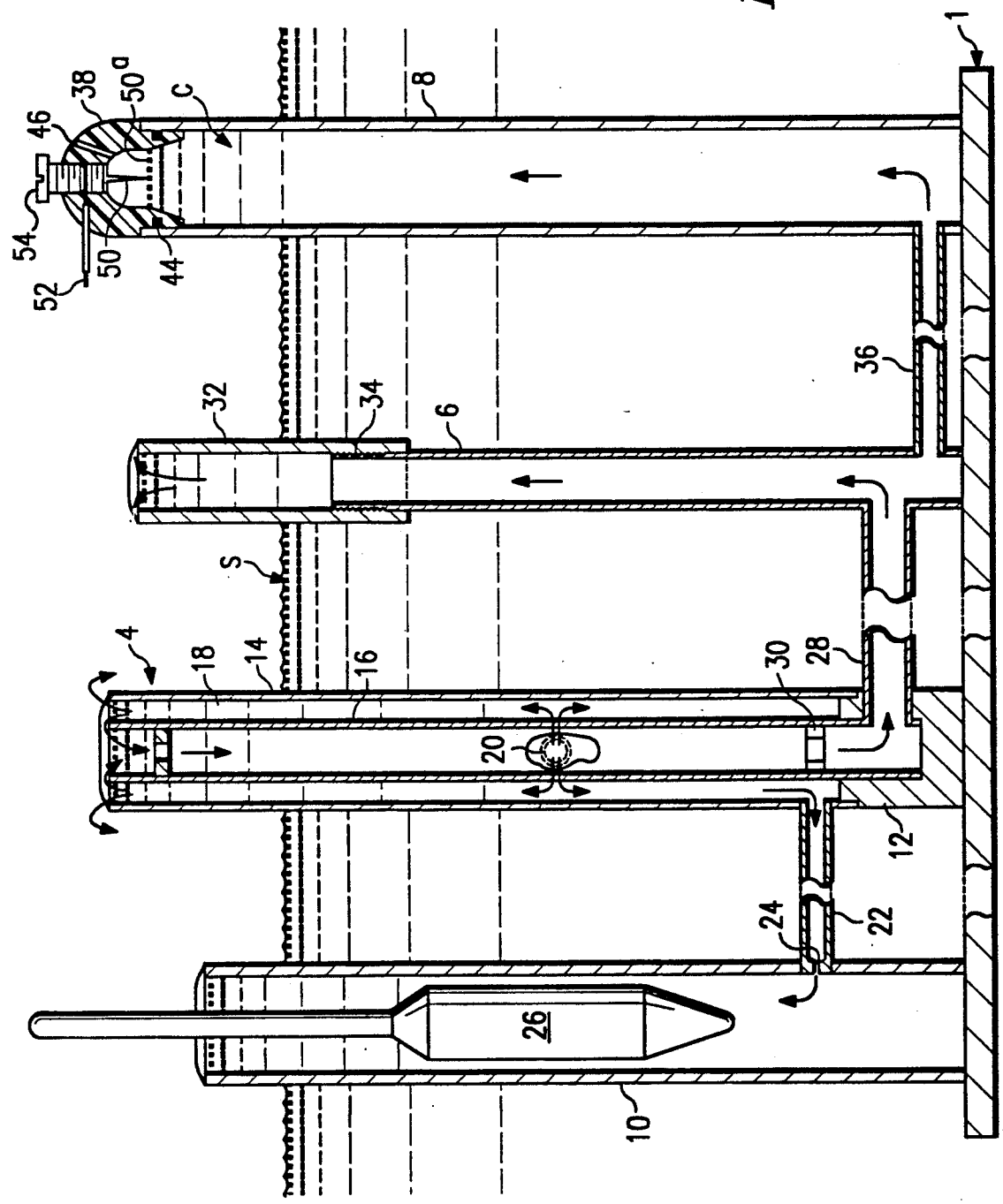

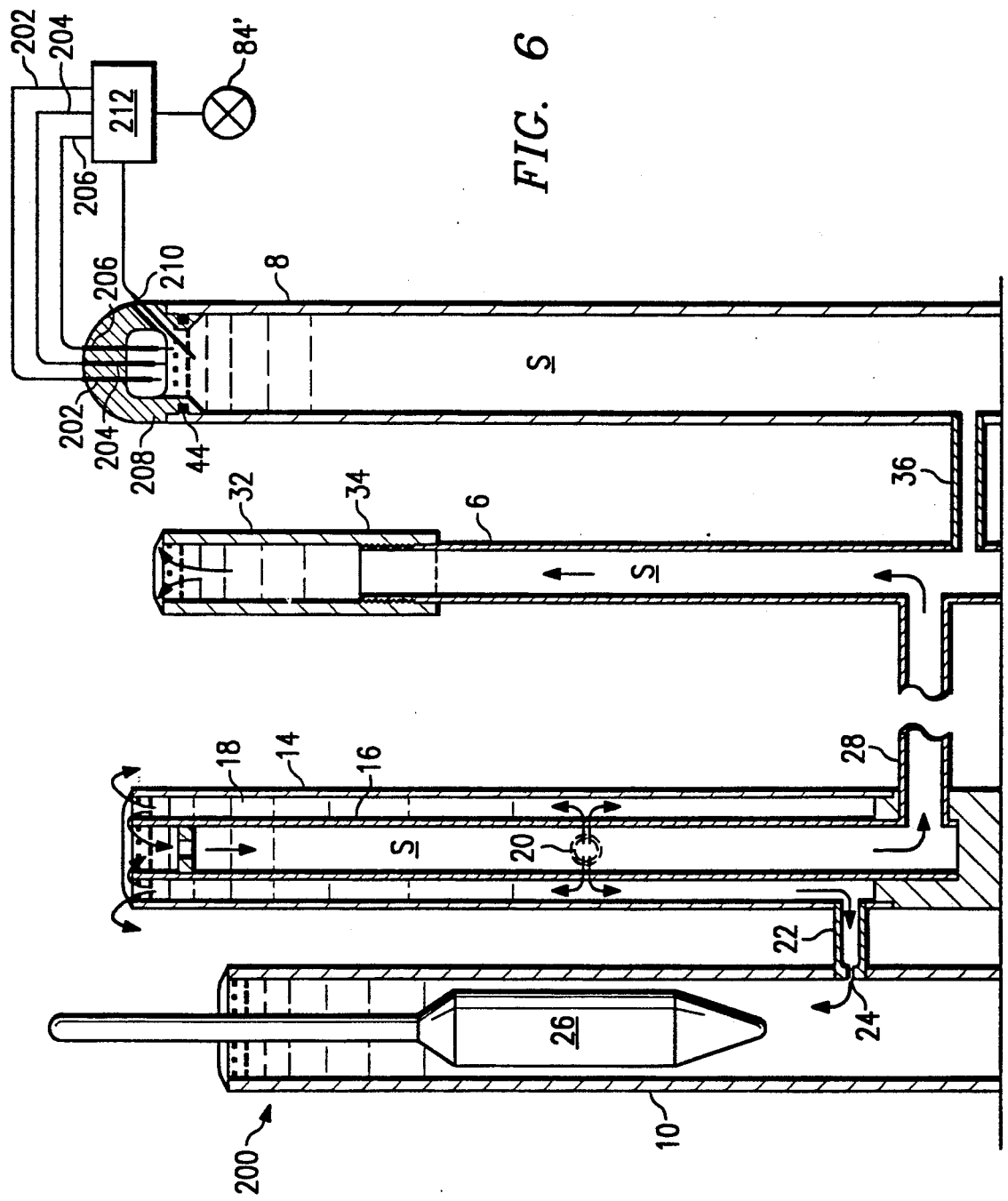

APPARATUS FOR MIXING FLUIDS OF DIFFERENT SPECIFIC GRAVITY

BACKGROUND OF THE INVENTION

This application relates to improvements in apparatus of the type disclosed and claimed in U.S. Pat. No. 3,557,817 to Edwin H. Royse entitled "Control for Mixing Fluids of Different Specific Gravity".

The above related patent discloses a free floating hydrometer in apparatus adapted to automatically control the specific gravity of liquid in which the hydrometer is floating. Such apparatus offers substantial improvements over devices previously developed in that the hydrometer was not employed to exert force upon mechanical apparatus for opening and closing switches.

U.S. Pat. No. 3,848,618 to Edwin H. Royse describes and illustrates an improvement over the hydrometer controlled apparatus described in the aforementioned patent in that the hydrometer has been eliminated to maximize the effect of external forces upon the system. However, additional flexibility has been found necessary in the industry and a need has arisen to improve on the basic apparatus disclosed in U.S. Pat. No. 3,848,618.

SUMMARY OF THE INVENTION

The apparatus hereinafter briefly described and illustrated in the attached drawing comprises apparatus for mixing liquids of different specific gravity which employs a U-shaped tube having two legs each of which is open to the atmosphere. One leg contains control liquid having a known specific gravity and a sample liquid is circulated through the other leg, the legs being joined such that a change in the specific gravity of sample solution result in a change in the elevation of the control liquid.

An electrode is positioned in the leg of U-shaped tube containing the control liquid such that the surface of the control liquid moves into engagement with the electrode when the specific gravity of the sample solution increases beyond a predetermined value and moves out of engagement with the electrode with the specific gravity of sample solution is less than a predetermined value.

The electrode is connected through suitable injector means for injecting liquid, such as alcohol, having a specific gravity less than that of the sample solution into the sample solution such that the specific gravity of the sample solution is maintained at a substantially constant level.

A primary object of the invention is to provide a control for maintaining the alcohol content of dampening fluid for lithographic printing presses at a desired level.

Another object of the invention is to provide control apparatus for mixing dampening fluid in which alcohol injected into fluid circulating from a reservoir is thoroughly mixed in a mixing chamber and a sample of the resulting solution is immediately tested thereby eliminating the possibility that excessive amounts of fluid will be injected into the reservoir.

The further object of the invention is to provide apparatus for mixing liquids of different specific gravity wherein two columns, one containing liquid of known specific gravity and the other containing a sample solution, are arranged such that the specific gravity of the sample solution would be automatically controlled by a variation in the height of the column of the control liquid.

A still further object of the invention is to provide a control for mixing dampening fluid having a high degree of accuracy which is adjustable and inexpensive to construct and use, making the use thereof economically feasible.

Other and further objects of the invention will become apparent upon referring to the detailed description hereinafter following and to the drawings annexed hereto.

An improved object of the invention is to provide refinement of the level sensing by employing a plurality of electrodes, each engagable with the control liquid surface at a different level to provide a more accurate determination of control liquid height.

In accordance with another aspect of the invention, a flexible diaphragm is positioned between the first and second legs to isolate the fluid in the first leg from the fluid in the second leg. This allows use of a conductive control liquid in the second leg and a nonconductive solution in the first leg.

BRIEF DESCRIPTION OF THE DRAWINGS

Drawings of a preferred embodiment of the invention are annexed hereto so that the invention may be better and more fully understood, in which:

FIG. I is a diagrammatic view of the invention illustrating the cooperative relationship between the control device and dampening fluid cooling and circulating apparatus;

Figure 1:
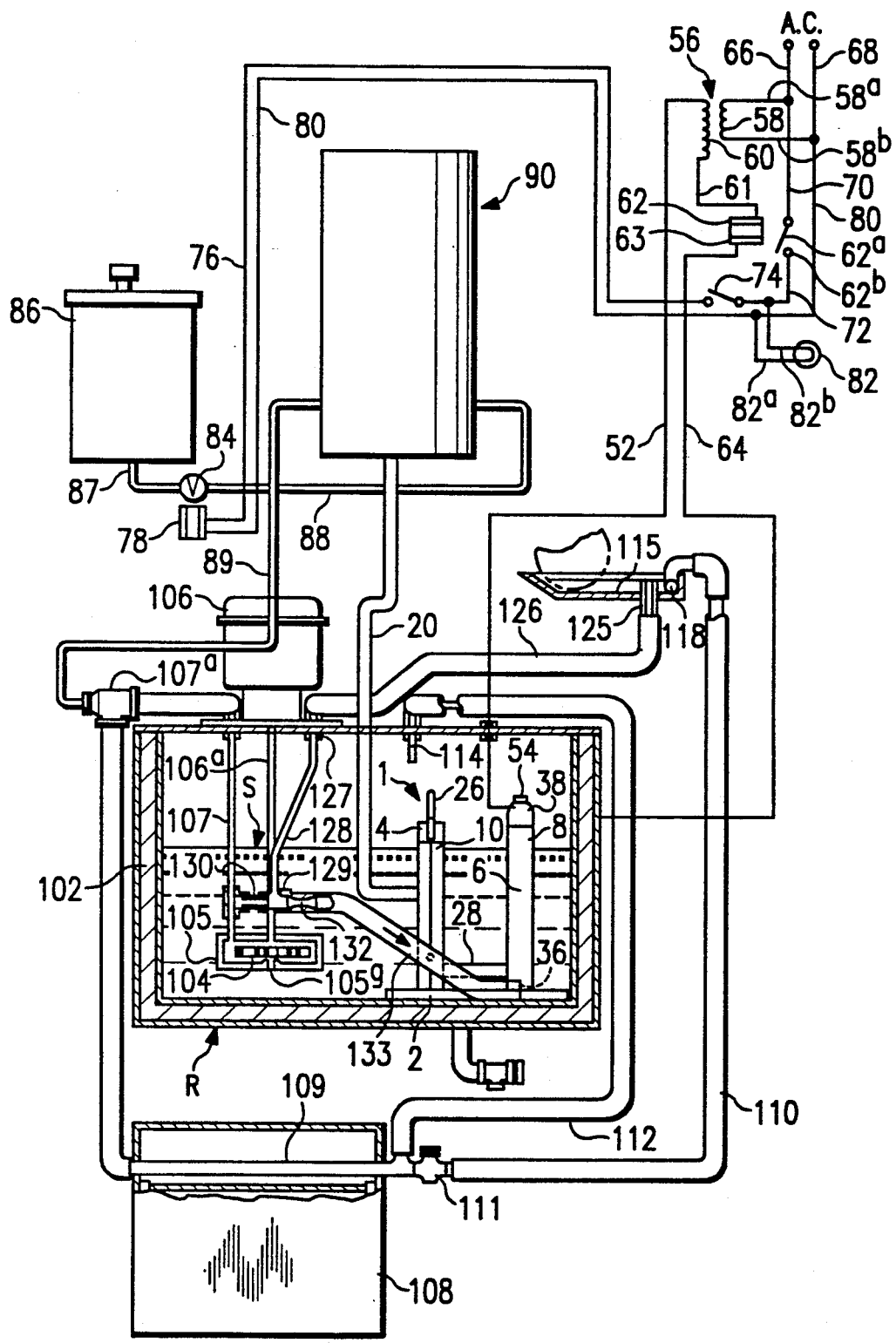
Figure 2:
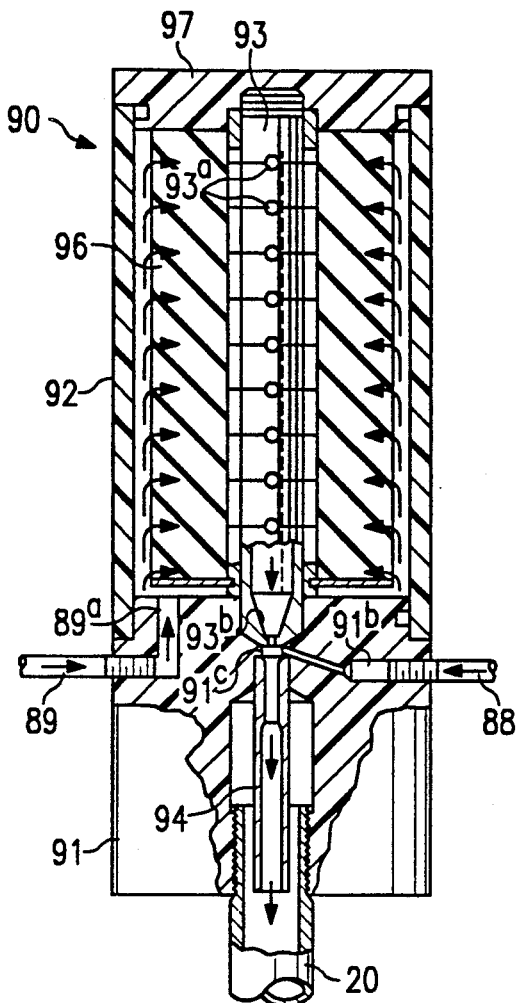
Figure 5:
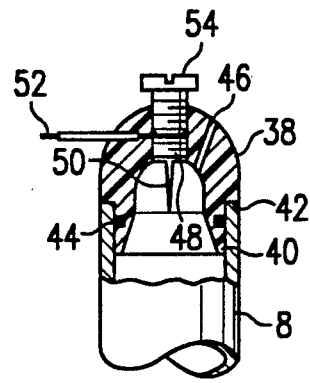
Figure 3:
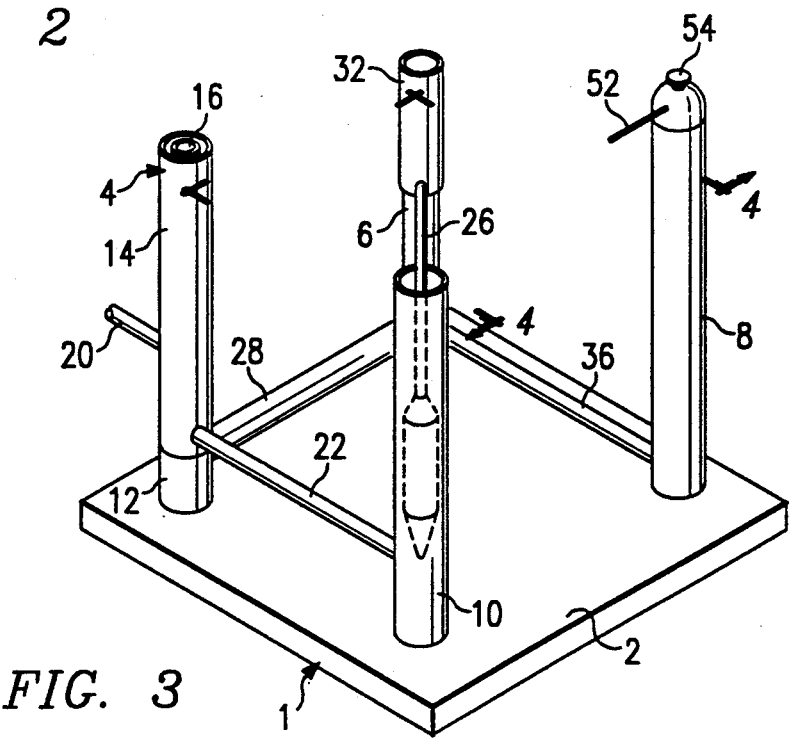
Figure 7:
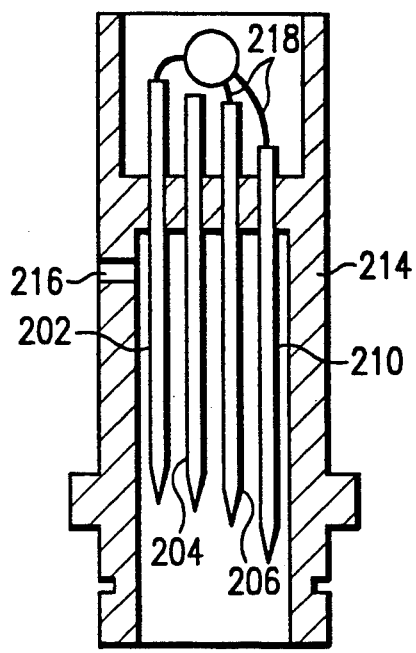
Figure 8:
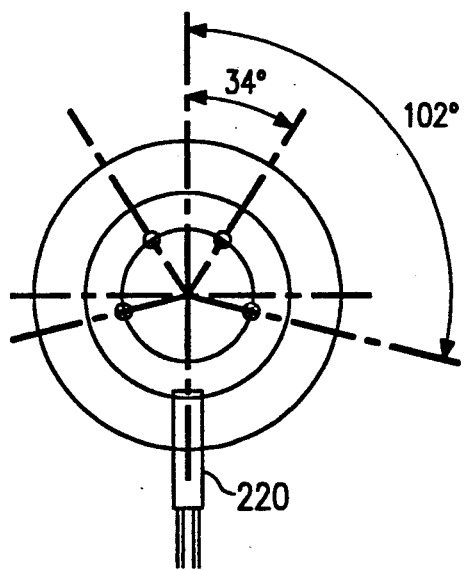
Figure 9:
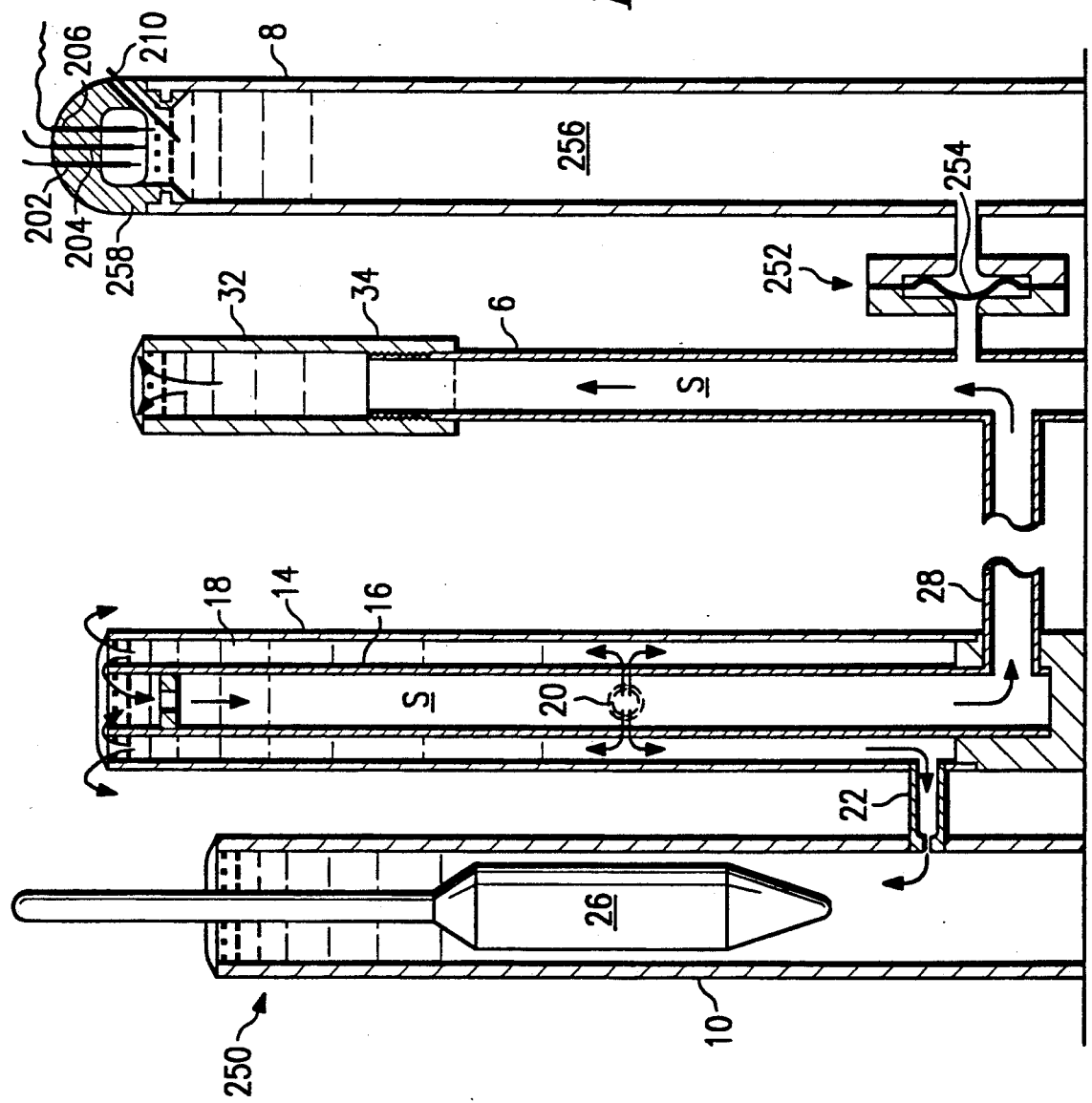

FIG. II is a cross-sectional view through filtration apparatus having a venturi formed therein to facilitate mixing liquids having different specific gravity;

FIG. III is a perspective view of the control apparatus;

FIG. IV is a cross-sectional view taken along line IV—IV of FIG. III;

FIG. V is an enlarged fragmentary cross-sectional view illustrating the electrode apparatus;

FIG. VI is a cross-sectional view through an improved apparatus which has enhanced discrimination of the control fluid level;

FIG. VII is a detailed cross-sectional view of the sensor cap of the apparatus of FIG. VI;

FIG. VIII is a top view of the sensor cap of FIG. VI;

FIG. IX is a cross-sectional view of another embodiment of the present invention which can be used to sense the level of nonconductive solutions by providing an isolating diaphragm between the nonconductive solution and the conductive control liquid.

Numeral references are employed to designate like parts throughout the various figures of the drawing.

DESCRIPTION OF THE PREFERRED EMBODIMENT

Referring to FIG. I of the drawing, the numeral 1 generally designates specific gravity control apparatus partially submerged in sample solution S.

As best illustrated in FIGS. III and IV control apparatus 1 comprises a support plate 2 having tubes 4, 6, 8 and 10 mounted thereon.

Distribution tube 4 comprises a base member 12 supporting an outer tube 14 and an inner tube 16 arranged to provide an annular flow passage 18 therebetween. Outer tube 14 has a supply line 20 extending therethrough communicating with annular passage 18 for delivering sample solution to the control apparatus as will be hereinafter more fully explained.

A tube 22 having a flow restrictor 24 disposed therein has opposite ends connected between distribution tube 4 and hydrometer well 10. One end of tube 22 extends through the wall of outer tube 14, communicating with the lower portion of annular passage 18, and the other end of tube 22 extends through the wall of tube 10 having a hydrometer 26 freely floating therein.

A portion of the flow through supply line 20 flows downwardly through annular passage 18, through tube 22 and restrictor 24 into the tube 10. Thus a small proportion of the sample solution is continuously circulated through tube 10 such that hydrometer 26 provides a visual indication of the specific gravity of the solution.

Tube 28 extends between the distribution tube 4 and tube 6. One end of tube 28 extends through an opening formed in base 12, communicating with the passage extending through inner tubular member 16, while the other end of tubular member 28 communicates with a passage inside tube 6. A portion of the flow through supply line 20 passes upwardly through annular passage 18, a portion of the upwardly directed flow through annular passage 18 passes into the passage through inner tube 16 while excessive flow passes outwardly into the reservoir of sample solution S.

Inner tube 16 has the restrictor 30 arranged to control the flow rate through tubular member 28.

The upper end of tube 6 has a sleeve 32 adjustably connected thereto by suitable means such as threads 34. To adjust the height of a column of liquid in tube 6 sleeve 32 can be rotated.

A horizontally disposed tube 36 has opposite ends secured in apertures formed in lower portions of tubes 6 and 8 such that tubes 6, 36 and 8 form a U-shaped tube having two legs, one of which is adapted for adjustment of the height thereof.

Tube 8 has a cap 38, as best illustrated in FIG. V, secured to the upper end thereof. In the particular embodiment of the invention illustrated in the drawing, cap 38 has a reduced diameter portion 40 adjacent the lower end thereof forming a shoulder 42 arranged to engage the upper edge of the wall of tube 8 for accurately positioning cap 38 relative to tube 8. An O-ring seal 44 is positioned for sealing between reduced diameter portion 40 of cap 38 and the inner surface of tubular member 8. O-ring seal 44 in addition to providing a seal which will not leak liquid, provides frictional force for maintaining cap 38 in a desired position.

Cap 38 has a vent passage 46 formed therein such that the inside of cap 38 is maintained at atmospheric pressure. However, the vent opening 46 is small to minimize evaporation of the control liquid.

A threaded passage is formed in the upper portion of cap 38 into which a set screw 48 is adjustably secured. Set screw 48 has a gold needle 50 extending downwardly therefrom forming an electrode, the function of which will be hereinafter more fully explained.

An electrical conductor 52 is maintained in engagement with set screw 48 by a locking screw 54 which extends into the threaded passage in cap 38.

The electrical circuit employed in combination with control apparatus 1 is illustrated in FIG. I of the drawing and comprises a transformer 56, having a primary winding 58 and a secondary winding 60, connected to actuate suitable switching means such as single pole, single throw solenoid actuated relay 62.

A suitable source of electricity (not shown) is connected by lines 66 and 68 through lines 58a and 58b to opposite ends of the primary winding 58 of the transformer.

One end of secondary winding 60 of the transformer is connected through a line 61 of the windings of a coil 63 of relay 62. The other side of the coil 63 is connected through a common conductor 64 to the case of a dampening fluid reservoir R. The other side of the secondary winding 60 is connected through conductor 52 to electrode 50 secured in cap 38 on the upper end of the tube 8 described heretofore. Thus coil 63 of relay 62 is energized when the upper surface of control liquid in tube 8 engages electrode 50 completing a circuit between conductor 52 and conductor 64.

Electrical line 66 is connected through a line 70 to a pole 72a of relay 62 and contact 62b of relay 62 is connected through a line 72, switch 74 and line 76 to one side of the coil of valve actuating means 78. The other side of the coil of valve actuating means 78 is connected through a conductor 80 to line 68 such that when the pole 62a of relay 62 is in engagement with contact 62b the coil of actuating means 78 is energized.

A pilot light 82 is connected through conductors 82a and 82b with conductors 80 and 72 respectively providing visual indication when actuating means 78 is energized.

Actuating means 78 preferably comprises a solenoid arranged to shift closure means in valve 84.

A fluid supply source 86, comprising a container of alcohol or other liquid having a specific gravity different from that of sample solution S, is connected through a line 87, valve 84 and line 88 with mixing apparatus 90. Sample solution S is delivered through line 89, as will be hereinafter more fully explained, to mixing apparatus 90.

Mixing apparatus 90 comprises a base adaptor 91 (See FIG. II) having a hollow cylindrical member 92 detachably secured thereto forming a chamber through which a tube 93 extends. Base adaptor 91 has a stepped passage extending through a central portion thereof, the upper end of said passage being threaded to receive the lower end of tube 93.

Tube 93 has spaced apertures 93a extending through the wall thereof and the lower end of the passage through tubular member 93 is tapered to form a nozzle 93b.

Conduit 88, communicating with supply source 86, extends into an opening 91b formed in base adaptor 91 of mixing apparatus 90. Passage 91b terminates adjacent the outlet of nozzle 93b such that a high velocity jet of fluid discharged from the nozzle will create a partial vacuum drawing liquid through passage 91b into mixing chamber 91c. A threaded adaptor 94, having a restriction in the passage therethrough, is secured in the lower end of the mixing chamber 91c to assure mixing of liquids moving through nozzle 93b and passage 91b.

Supply line 20 is connected to base adaptor 91 to receive this solution discharged from adaptor 94. As hereinbefore described, supply line 20 communicates with the annular passage 18 between outer tube 14 and inner tube 16 of distribution tube 4 such that a portion of the solution flows to and through tube 6.

Cylindrical member 92 preferably has a filter element 96 disposed therein and has cap 97 arranged to seal about the upper end of mixing apparatus 90.

The control system is particularly adaptable for use as a control device for automatically maintaining a desired specific gravity of dampening fluid used in lithographic printing. The relationship of the control device to the circulating and refrigerating system of the lithographic printing press is illustrated in FIG. I of the drawing.

The dampening fluid tank or reservoir R is provided having heat insulation 102 in the walls thereof. The dampening fluid S generally comprises a mixture of chemical ingredients in water, or may be water and other chemical ingredients mixed with alcohol, as it is used with the dampening device disclosed in U.S. Pat. No. 3,148,037 to Harold P. Dahlgren. The level of dampening fluid S is maintained above impellar 104 of the pump 105. The impellar 104 is rotated through a shaft 106a by an electric motor 106 mounted on the top of reservoir R. The impellar 104 picks up dampening fluid from reservoir R through the intake opening 105g in the wall of the pump housing. The dampening fluid is forced through a refrigerator unit 108 which has the usual compressor, condensor, receiver, filter dryer, expansion valve and evaporator coils therein. A portion of the fluid flowing through discharge line 107 is connected through coupling 107a and line 89 to mixing apparatus 90 as has been hereinbefore explained.

Discharge line 107 is connected to a pipe 109 which passes adjacent to the evaporator coils of the refrigeration unit, and as the dampening liquid passes therethrough, it is cooled. The temperature of the refrigeration unit may be maintained by suitable thermostat control (not shown).

A portion of the refrigerated dampening fluid is passed from the pipe 109 through a hand operated valve 111 and a supply line 110 to a dispenser pipe 118 which is disposed in the dampening fluid pan or fountain 115.

A branch line 112 communicates with the upper part of the reservoir R through a discharge nipple 114.

A return hose 126 is attached to the outlet drain nipple 125 through which dampening fluid may be returned from the pan 115 to the reservoir R. The hose 126 communicates with a drain back pipe 128 in the reservoir R through a suitable nipple 127 passing through the upper wall of the reservoir. The drainback pipe 128 is connected in communication with a T-fitting 129.

A restrictor nozzle 130 is connected between an outlet from the discharge conduit 107 and the T-fitting 129. A venturi 132 is connected to an outlet of the T-fitting 129 opposite the restrictor nozzle 130. A venturi discharge line 133 is connected to the opposite end of the venturi 132 and terminates at the bottom of the reservoir R.

Dampening fluid circulating through supply line 110 into pan 115 is exposed to the atmosphere and the alcohol evaporates therefrom, changing the chemical composition of the dampening fluid, which results in a reduction of the quality of printing.

The operation and function of the device hereinbefore described is as follows:

A portion of the dampening fluid S forced through discharge line 107 by pump impellar 104 passes through line 89, passage 89a in mixing apparatus 90, through foraminous filter element 96 into passages 93a in tube 93. Solution S passes through nozzle 93b drawing alcohol into mixing chamber 91c if valve 84 is open. Solution from mixing chamber 91c is delivered through supply line 20 to the annular passage 18 between distribution tubes generally designated by numeral 4.

A portion of the solution S passes downwardly through annular passage 18, through tube 22 and into tube 10 having hydrometer 26 floating therein. Hydrometer 26 provides a visual indication of the specific gravity of the dampening fluid.

A portion of the solution delivered through supply line 20 passes upwardly through annular passage 18, downwardly through the passage in inner tube 16, through restrictor 30, tubular member 28 and upwardly through tube 6. The height of the column of solution in tube 6 is adjustable by manipulating sleeve 32 as hereinbefore described.

Since tubes 14 and 16 have a fixed length the head urging solution through oriface 30 is constant such that steady flow conditions are maintained in tube 6.

Tube 8 is filled with fluid having a known specific gravity, preferably a specific gravity equal to the desired specific gravity of solution S.

Tube 36 connecting lower ends of tube 6 and tube 8 preferably has a relatively small flow passage, for example, ⅛ inch, such that pressure at the lower ends of tubes 6 and 8 is maintained at a constant level. However, the passage should be sufficiently small to maintain an interface between the solution flowing through tube 6 and the control solution in tube 8 intermediate opposite ends of tube 36.

It should be readily apparent that when the specific gravity of solution S is at the desired level the surface 50a of control liquid C should be adjacent contact 50.

As alcohol evaporates from solution S the specific gravity of the solution S will increase such that the column of solution in tube 6, which is maintained at a constant height, will result in an increase of pressure tube 36 and surface 50a of control liquid C which is maintained at a constant density, will move upwardly engaging electrode 50.

When control liquid C engages electrode 50 an electrical circuit is completed through conductors 52 and 64 energizing the coil 63 of relay 62 moving pole 62a into engagement with the contact 62b.

When relay 62 is energized current is directed through conductors 76 and 80 energizing the solenoid 78, shifting valve 84 to the open position. When valve 84 is opened alcohol is drawn through line 88 and passage 91b into the mixing chamber 91c in mixing apparatus 90.

When the specific gravity of solution S delivered through supply line 20 is sufficiently reduced the pressure in tube 36 joining tube 6 and 8 will be reduced to a level at which the circuit between the control liquid C and electrode 50 will be broken thus closing valve 84 stopping the flow of alcohol.

From the foregoing it should be readily apparent that the apparatus hereinbefore described is capable of measuring very slight changes in specific gravity of solution S and is adapted to automatically inject a fluid of different specific gravity into the solution such that the specific gravity of the solution is maintained at a substantially constant level. It should be further apparent that, although the apparatus is extremely accurate, manufacturing and maintenance costs are minimized.

With reference now to FIGS. VI–VIII, an improved specific gravity control apparatus 200 is disclosed which permits an enhanced discrimination of the control level by using a plurality of electrodes 202, 204 and 206 in the sensor cap 208. Each electrode is set at a slightly different height to provide this discrimination, as will be described in further detail hereinafter.

Many of the components of apparatus 200 are identical to those described previously for apparatus 1, and those elements have been identified by the same reference numerals. However, as noted, sensor cap 208 illustrated in FIG. VI, is provided with three electrodes 202, 204 and 206, as well as a ground electrode 210, to provide the enhanced control level sensing. As can be understood, the middle electrode 204 in elevation is the control electrode and represents the ideal level of the control fluid to be maintained. The electrode 202 is a low alarm electrode, as the electrode ends at an elevation slightly above that of the control electrode 204, so that if that low alarm electrode 202 contacts the fluid surface, it is known that the control liquid level in the apparatus is a set quantity or increment different than the ideal level sensed by the control electrode 204. Similarly, a high alarm electrode 206 is provided which ends at an elevation slightly below that of the control electrode 204 to again indicate that the control liquid level has changed a definite quantity away from the ideal control level.

As illustrated in FIG. VI, an automated sensor control 212 can take the input from the three electrode sensors and ground to perform a number of control functions either at the apparatus, or remote from the apparatus. For example, the range between the control electrode and electrodes 202 and 206 can be treated as a permissible range variation in the fluid, and additional fluid from supply source 86 will not be delivered through valve 84' until the sensors extend outside this permissible range. Alternatively, the use of a plurality of electrodes can provide calibration for the apparatus. For example, the electrodes can be set at levels corresponding to incremental concentration of the fluid from source 86, such as electrode 202 being 1%, electrode 204 being 2% and electrode 206 being 3%, for example. This would allow the control 212 to remotely monitor the actual concentration of the solution, rather than just that it is above a set level. Also, use of three or more electrodes allow the same apparatus to be used to control solutions of different concentrations. For example, if ten electrodes were used like electrodes 202–206, each spaced at a different height, the fifth one down might be the level of the optimal concentration point for one solution, while a level at the eighth one down might be the optimal concentration of another solution. The control 212 can be designed to control the level to whichever electrode is proper for a given solution.

FIGS. VII and VIII provide a specific design for the sensor cap 208. The four electrodes 202, 204, 206 and 210 are each formed of gold plated electrode needles which are mounted in a clear plastic body 214 which fits atop the tube 8. The body has a vent hole 216 to insure that atmospheric pressure exists above the level of the control liquid. Individual control wires 218 extend from each of the electrodes and are carried along a cable 220 to the sensor control 212. The body 214 is preferably formed of clear plastic which provides the opportunity for a visual confirmation of the level of the control liquid.

While three different electrodes are shown at different levels, any number of additional electrodes can be used to provide even greater discrimination of fluid level. Multiple electrodes can also be used at the same level to give a reading of the level at several points across a horizontal cross-section of tube 8 to provide redundant signals and avoid spurious signals if the fluid is sloshing or moving.

With reference now to FIG. IX, a specific gravity control apparatus 250 forming yet another embodiment of the present invention is illustrated. Again, many components of the apparatus 250 are identical to those in apparatus 1 and apparatus 200, and are identified by the same reference numerals. However, apparatus 250 is specifically designed to permit the monitoring of specific gravity of a solution S which is nonconductive, such as petroleum or a solution for whatever reason is not suitable to put in tube 8. Apparatus 250 is provided with a coupling 252 which connects the tube 6 and tube 8. Within the coupling is a flexible diaphragm 254 which physically isolates the solution S from the control liquid 256 in tube 8, which fluid 256 can be conductive. The flexible diaphragm 254 is sufficiently flexible to convey the hydrostatic head of the fluids in tubes 6 and 8 to permit the apparatus 250 to work in the same manner as apparatus 1 and apparatus 200. The sensor cap 258 can have a plurality of electrodes such as sensor cap 208 to provide enhanced discrimination of the control liquid level.

The preferred embodiment of the invention hereinbefore described has been related to controlling the specific gravity of dampening fluid employed in lithographic printing operations. However, I anticipate the use of the control apparatus in combination with other devices since other and further embodiments of the apparatus may be readily devised without departing from the basic concept of the invention.

I claim:

1. A device for controlling the specific gravity of a solution of first and second liquids comprising:
   a reservoir;
   means for admitting the solution into the reservoir;
   actuated valve means adapted to admit first liquid into the means for admitting the solution into the reservoir;
   a U-shaped tube in said reservoir, said U-shaped tube having first and second legs, each of said legs being open to atmosphere;
   means to admit solution to said first leg to form a column of solution therein;
   means associated with said first leg to adjust the height of the column of solution;
   control liquid in said second leg forming a column of control liquid therein;
   a plurality of electrodes secured to said second leg, each of said electrodes being engagable by said control liquid at a different elevation to sense changes in the level of the column of control liquid, said electrodes being adapted to actuate said actuated valve means.

2. The device of claim 1 further comprising a sensor control to sense the engagement of said plurality of electrodes with the control liquid, one of said electrodes being a control electrode at a height set to be the optimal control liquid level, others of said electrodes being at different elevations, said sensor control actuating said valve means in response to the signals measured by said electrodes.

3. The device of claim 2 wherein said valve means has at least two positions to admit the first liquid at different rates, said sensor control sensing the position of the control liquid through said plurality of electrodes to set the rate of first fluid through the valve means as a function of the disparity between the actual control liquid level and an optimal control liquid level.

4. A device for controlling the specific gravity of a solution of first and second liquids comprising:
   a reservoir;

means for admitting the solution into the reservoir;

actuated valve means adapted to admit first liquid into the means for admitting the solution into the reservoir;

a U-shaped tube in said reservoir, said U-shaped tube having first and second legs, each of said legs being opened to atmosphere;

means to admit solution into said first leg to form a column of solution therein;

means associated with said first leg to adjust the height of the column of solution;

a control liquid in said second leg forming a column of control liquid therein;

a coupling including a flexible diaphragm positioned between the first and second legs, the diaphragm having first and second sides, the first side of the diaphragm being exposed to the solution in the first leg and the second side of the diaphragm being exposed to the control liquid, the flexible diaphragm transmitting hydrostatic pressures between the fluids in the first and second leg, but physically isolating the liquids from each other;

at least one electrode being engageable by said control liquid to sense changes in the level of the column of control liquid, said electrode being adapted to actuate said actuated valve means; and a plurality of electrodes, each engageable with the control liquid at a different height to provide greater discrimination of fluid level.

* * * * *